US007161952B1

(12) United States Patent  (10) Patent No.: US 7,161,952 B1
Herrmann  (45) Date of Patent: Jan. 9, 2007

(54) WIRELESS NETWORK WITH A PLURALITY OF PERSISTENCY PROBABILITIES FOR ACCESSING A RACH CHANNEL

(75) Inventor: Christoph Herrmann, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 597 days.

(21) Appl. No.: 09/663,315

(22) Filed: Sep. 15, 2000

(30) Foreign Application Priority Data

Sep. 20, 1999 (DE) ................................. 199 45 061
Oct. 30, 1999 (DE) ................................. 199 52 076
Nov. 30, 1999 (DE) ................................. 199 57 655

(51) Int. Cl.
*H04J 3/02* (2006.01)
(52) U.S. Cl. ........................................ 370/462; 370/329
(58) Field of Classification Search ................ 370/322, 370/337, 347, 348, 447, 448, 461, 462, 329
See application file for complete search history.

(56) References Cited

U.S. PATENT DOCUMENTS

| 4,866,788 | A |   | 9/1989  | Mouly et al. ................... 455/9  |
|-----------|---|---|---------|----------------------------------------|
| 5,142,533 | A | * | 8/1992  | Crisler et al. ................ 370/349 |
| 5,537,414 | A | * | 7/1996  | Takiyasu et al. ............. 370/347   |
| 5,706,274 | A | * | 1/1998  | Angelico et al. ............ 370/445    |
| 5,729,542 | A | * | 3/1998  | Dupont ........................ 370/346 |
| 5,752,193 | A | * | 5/1998  | Scholefield et al. ...... 455/452.2     |
| 5,956,325 | A | * | 9/1999  | Citta et al. ................... 370/252 |
| 6,078,572 | A | * | 6/2000  | Tanno et al. ................. 370/335  |
| 6,374,099 | B1| * | 4/2002  | Bi et al. ................... 455/404.1 |
| 6,493,540 | B1| * | 12/2002 | Suzuki ..................... 455/67.11   |
| 6,574,212 | B1| * | 6/2003  | Jurgensen et al. .......... 370/348     |
| 6,597,682 | B1| * | 7/2003  | Kari ........................... 370/348 |
| 6,621,807 | B1| * | 9/2003  | Jung et al. .................. 370/335  |
| 6,636,496 | B1| * | 10/2003 | Cho et al. .................... 370/335 |

FOREIGN PATENT DOCUMENTS

EP          0765096 A2      3/1997

OTHER PUBLICATIONS

"Mac Protocol Specification, TS 25.321, V3.0.0 (Jun. 1996)" Third Generation Partnershipproject. Technical Specification Group. RAN WG4 Reception, Jun. 1999, pp. 1-35.
"TSG-RAN Working Group 2 (Radio layer 2 and Radio layer 3), Sophia-Antipolis, France, Aug. 16 to 20, 1999, TS 25.321, V.3.0.0 (Jun. 1999), 3$^{rd}$ Generation Partnership Project (3GPP); Technical Specification Group (TSG) RAN; Working Group 2 (WG2); MAC protocol specification".

* cited by examiner

*Primary Examiner*—Huy D. Vu
*Assistant Examiner*—Christine Ng

(57) ABSTRACT

A wireless network employs at least a base station and a plurality of assigned terminals for exchanging user data and control data. The terminals are each provided for transmitting a reservation message depending on a first persistency probability for assigning transmission capacity for at least one data packet to the assigned base station. Any further transmission of the reservation message received at least once by the base station depends on a different persistency probability.

9 Claims, 5 Drawing Sheets

Figure 1:
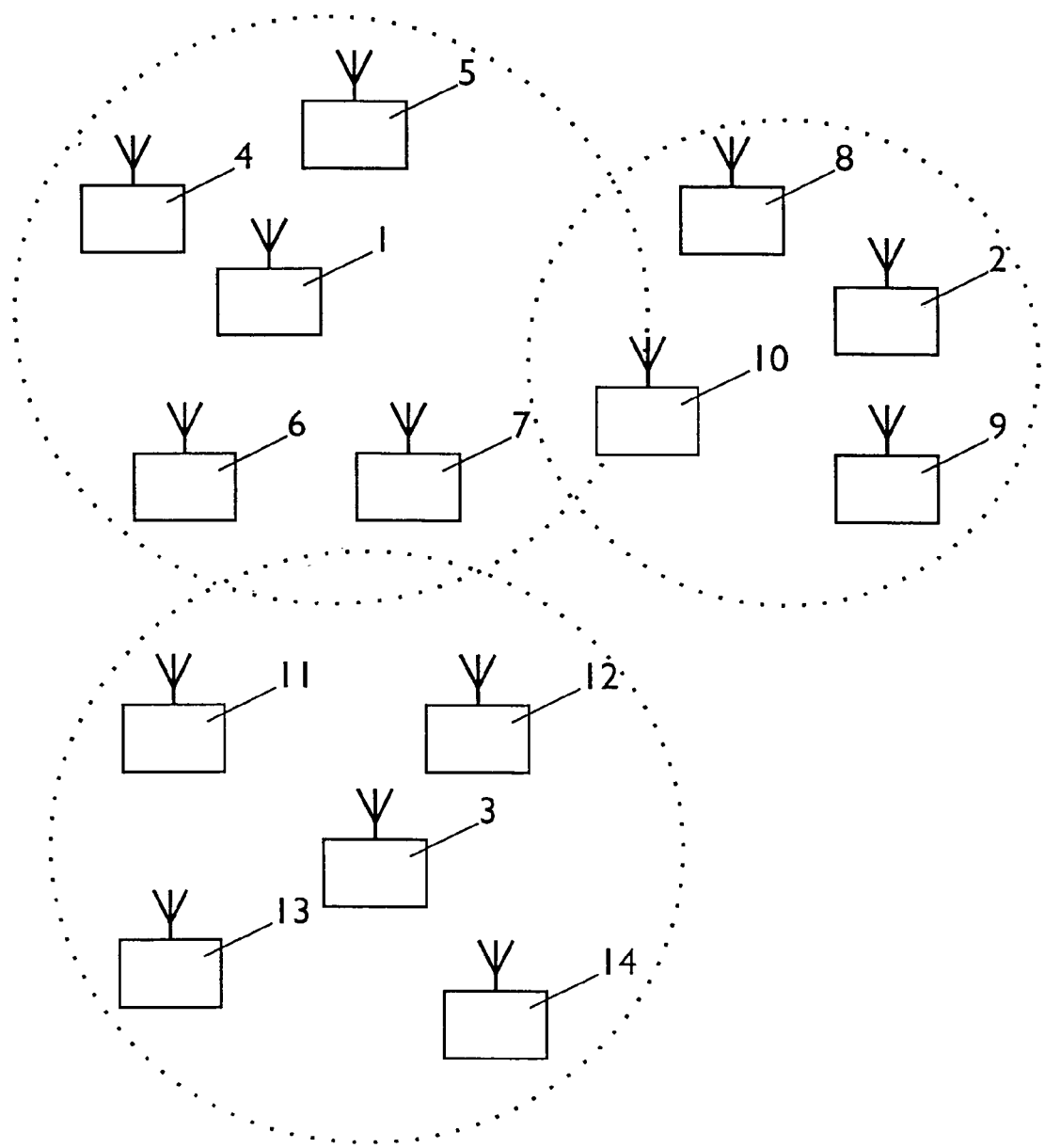

WIRELESS NETWORK WITH A PLURALITY OF PERSISTENCY PROBABILITIES FOR ACCESSING A RACH CHANNEL

The invention relates to a wireless network comprising at least a base station and a plurality of assigned terminals for exchanging user data and control data, which terminals are each provided for transmitting to the assigned base station a reservation request that depends on a first persistency probability for assigning transmission capacity for at least one data packet.

In the document "TSG-RAN Working Group 2 (Radio layer 2 and Radio layer 3), Sophia-Antipolis, France, 16 to 20 Aug. 1999, TS 25.321, V.3.0.0 (1999-06), 3rd Generation Partnership Project (3GPP); Technical Specification Group (TSG) RAN; Working Group 2 (WG 2); MAC protocol specification", a MAC protocol (MAC=Medium ACcess protocol) is proposed for a radio network. The radio network comprises a plurality of radio cells having each a base station and terminals or mobile stations located in these cells. After a terminal has been registered and synchronized, it transmits a random access burst, for example, for requesting a user channel, by a collision-prone channel, which is referenced a RACH channel (RACH=Random Access CHannel). The random-access burst comprises a preamble part and a data part. Before a random-access burst can be transmitted from a terminal to the base station, a test is made whether, for example, the transmission power of the terminal is sufficient, by transmitting only a preamble. Prior to the transmission, a terminal is to check whether a random number formed by the terminal is smaller than a persistency probability transmitted by the base station to the terminal. If the random number is smaller than the persistency probability, the preamble is allowed to be transmitted. If the terminal transmitting a preamble has not received a message from the base station within a certain period of time, a new request for transmission will be made with more transmission power after a certain period of time. The transmission power is increased, as required up to a predefined maximum value. Alternatively, the terminal receives either an assignment request or a rejection message, or, after a predefined period of time (time-out) has elapsed, neither an assignment message nor a rejection message. In the latter case, the base station has, for example, not been able to detect the transmitted preamble. In the case of an assignment message, the terminal can transmit the data part of the random-access burst with the transmission power set. The base station transmits, for example, a rejection message when there is no channel capacity available for transmitting the data part. In the case of a rejection message, a renewed transmission attempt is made after a specific period of time with the original initial transmission power, and this power is then increased successively (power ramping). In the event of a new transmission attempt, first a random number is to be compared with the persistency probability. The access procedure described holds for all the terminals. No distinction is made between terminals that try to transmit a random-access burst for the first time, and those that have already received a rejection message from the base station, and those that have received neither an assignment nor a rejection message. In the network this may lead to unacceptable waiting times for the transmission of random access bursts.

It is an object of the invention to provide a wireless network in which the waiting time for the transmission of random-access bursts is reduced.

The object is achieved by a wireless network of the type defined in the opening paragraph, in that the further transmission of a reservation request received at least once by the base station depends on at least a further persistency probability.

The wireless network according to the invention is understood to mean a network having a plurality of radio cells, in which network a respective base station and a plurality of terminals transmit control data and user data via a wireless transmission. A wireless transmission is used for transmitting information signals, for example, by radio, ultrashell or infrared links.

According to the invention, different persistency probabilities are used to individually adapt the type of access. Reservation requests are then handled in different ways. A data packet contains a preamble part and a data part and transmits a preamble as a reservation request of a terminal. An assignment of transmission capacity means that a terminal can transmit a data part of a random-access burst by the RACH channel. A terminal, after receiving an assignment message, is provided for transmitting the data part of the data packet.

If a terminal again transmits a preamble after a defined period of time has elapsed after a data part has been transmitted, it is a matter of a first type of access. A second type of access means that a terminal has received a rejection message after a preamble has been sent. With a third type of access, a terminal again sends a preamble within the defined period of time after a data part has been sent. If a terminal has received neither an assignment message nor a rejection message, after sending a preamble and increasing the transmission power up to the maximum transmission power step by step (power ramping), we are facing a fourth type of access. With this type of access the persistency probabilities for the first, third and fourth types of access are periodically sent over the broadcast or distribution channel to all the terminals, whereas the persistency probability for the second type of access is sent only when a rejection message has been transmitted to all the terminals over the broadcast or distribution channel. In the latter case, the rejection message is linked to the respective rejected preamble, so that the persistency probability for the second type of access can be determined differently, depending on the preambles. This particularly increases the waiting time as compared with the known wireless networks.

Alternatively, only when a rejection message has been received can the base station transmit a factor to the terminal over the broadcast or distribution channel. From the received factor and the first persistency probability the terminal forms the second persistency probability. In the latter case the rejection message is linked with the respective rejected preamble, so that the persistency probability for the second type of access may be determined differently depending on the preambles.

The invention relates to a terminal in a wireless network that comprises at least a base station and further assigned terminals for exchanging user data and control data. The terminal is provided for transmitting a reservation request to the base station in dependence on a first persistency probability. The reservation request contains a request for transmission capacity of at least one data packet. Whether or not the terminal transmits another reservation request that has already been received by the base station depends on a second persistency probability.

Examples of embodiment of the invention will be further explained hereinafter with reference to the drawing Figures in which:

FIG. 1 shows a wireless network comprising a plurality of base stations and terminals, and FIGS. 2 to 6 show flow charts in explanation of the assignment of a RACH channel for the transmission of a data packet by a terminal.

FIG. 1 shows a wireless network, for example, a radio network, comprising a plurality of base stations 1 to 3 and a plurality of terminals 4 to 14. Certain terminals 4 to 14 are assigned to a base station 1 to 3. In the example shown in FIG. 1, the base station is assigned the terminals 4 to 7, the base station 2 the terminals 8 to 10 and the base station 3 the terminals 11 to 14. An exchange of control data takes place at least between the base station and the terminals. An exchange of user data may be effected both between the base station and the terminals and also directly among the terminals. In both cases the base station sets up the connection for transmitting user data. The terminals 4 to 14 are usually mobile stations, which are controlled by a fixedly installed base station 1 to 3. A base station 1 to 3 may also be movable or mobile, as appropriate.

Radio signals are transmitted in the wireless network, for example, in accordance with the FDMA, TDMA or CDMA method (FDMA=Frequency-Division Multiple Access, TDMA=Time-Division Multiple Access, CDMA=Code-Division Multiple Access), or in accordance with a combination of the methods.

In the CDMA method, which is a special code-spreading method, binary information (a data signal) coming from a user is modulated with a respective code sequence. Such a code sequence comprises a pseudo-random square-wave signal (pseudo-noise code), whose rate, also called chip rate, is generally considerably higher than that of the binary information. The duration of a square-wave pulse of the pseudo-random square-wave signal is referenced a chip interval $T_C$. $1/T_C$ is the chip rate. The multiplication or modulation respectively, of the data signal by the pseudo-random square-wave signal results in a spreading of the spectrum by the spreading factor $N_C=T/T_C$, where T is the duration of a square-wave pulse of the data signal.

User data and control data between at least one terminal and a base station are transmitted by channels predefined by the base station. A channel is determined by a frequency range, a time range and, for example, in the CDMA method, by a spreading code. The radio link from the base station to the terminals is referenced a downlink and from the terminals to the base station an uplink. Thus, downlink channels transmit data from the base station to the terminals and uplink channels from the terminals to the base station. For example, a downlink control channel may be provided which is used for distributing control data from the base station to all the terminals prior to a connection set-up. Such a channel is referenced a downlink broadcast control channel. For transmitting control data from a terminal to the base station prior to a connection set-up, it is possible to use, for example, a base-station-assigned uplink control channel which, however, may also be accessed by other terminals. An uplink channel that can be used by various terminals or all of them is referenced a common uplink channel. After a connection has been set up, for example, between a terminal and the base station, user data are transmitted by a downlink and an uplink user channel. Channels only set up between one transmitter and one receiver are referenced dedicated channels. As a rule, a user channel is a dedicated channel that can be attended by a dedicated control channel for the transmission of link-specific control data.

A collision-prone channel which will be referenced RACH channel in the following (RACH=Random-Access CHannel) is responsible for linking a terminal to a base station. Data packets can also be transmitted over such a signalized RACH channel.

For user data to be exchanged between the base station and a terminal, it is necessary that the terminal is synchronized with the base station. For example, from the GSM system (GSM=Global System for Mobile communication), in which a combination of FDMA and TDMA methods is used, it is known that, after a suitable frequency range has been determined on the basis of specified parameters, the position in time of a frame is determined (frame synchronization), with the aid of which frame the order in time for transmitting data is determined. Such a frame is always necessary for the data synchronization of terminals and base station in TDMA, FDMA and CDMA methods. Such a frame may contain several sub-frames, or, together with various other successive frames, form a superframe. For simplicity, a frame denoted as a reference frame is started from in the following. This reference frame may be, for example, the frame that has a duration of 10 ms in the UMTS system (UMTS=Universal Mobile Telecommunication System).

In order to enable frame synchronization, all the terminals must be synchronized with the base station by means of pulses which are transmitted by the base station. If no code spreading method (for example, CDMA method) is used, (for example, use is made of a TDMA method), the pulse duration exactly corresponds to the time interval necessary for the transmission of one bit. When use is made of a code spreading method, the pulse duration corresponds to a chip interval. A bit interval then corresponds to a plurality of chip intervals. The frame synchronization requires the transmission of a special pulse sequence by the base station. The start time of the pulse sequence corresponds to the start time of a frame.

Figure 2:
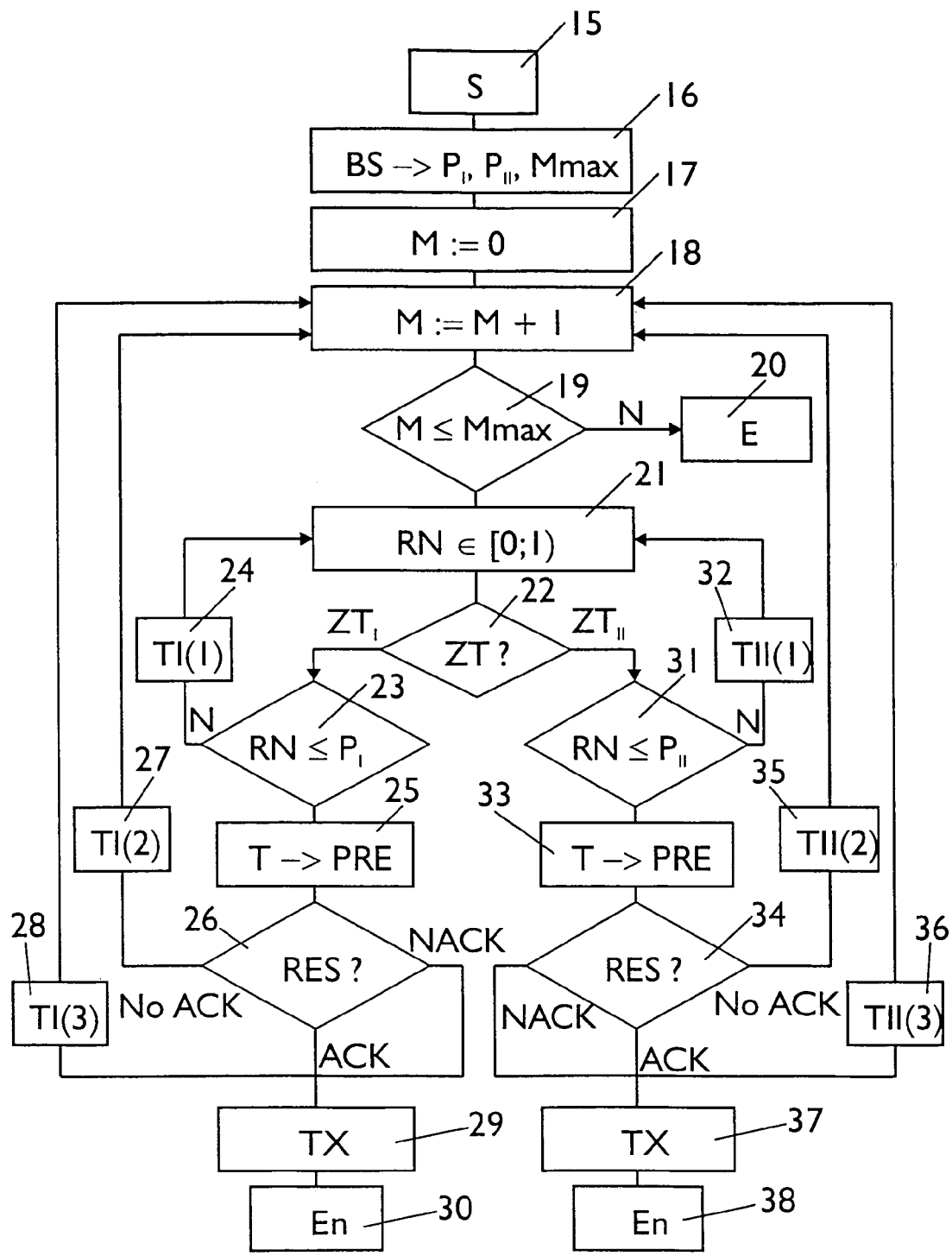

If a terminal after the synchronization likes to send a random-access burst, which comprises a preamble part and a data part, over a collision-prone channel which is referenced the RACH channel (RACH=Random-Access CHannel), various steps are carried out in the terminal which are indicated by a flow chart in FIG. 2. Block 15 in the FIG. 2 shows the start of the flow chart. The reception of various control parameters in the terminal (BS→$P_I$, $P_{II}$, Mmax) from the assigned base station is shown in block 16. For example, the base station sends the two persistency probabilities $P_I$ und $P_{II}$, and the maximum value Mmax which indicates the maximum number of successive access attempts to the RACH channel. First a count variable M is set to zero (block 17). This count variable M denotes the terminal's number of successive attempts at transmission already started.

The next step in the flow chart leads to a loop. The start of the loop is featured in a block 18 in which the count variable M is incremented. Then, in block 19, a test is made whether the count variable M is smaller than or equal to the maximum value Mmax. If this is not the case, there is a first loop end (block 20). Block 20 indicates an error E. In the other case (block 21) the terminal takes a random number RN (RN∈[0, 1]) from a random number generator not further shown.

The loop then divides into two branches after an inquiry in block 22. Block 22 checks the type of access ZT. It is a first type of access $ZT_I$ when the terminal tries for the first time to send a preamble, or when the reception of a previously transmitted preamble has not been acknowledged by the base station. Otherwise it is a second type of access $ZT_{II}$. Then the terminal has already received a rejection message from the base station. The rejection message is sent by the base station when there is, for example, no channel capacity available for the transmission of the data part. When it is the first type of access $ZT_I$, the random number RN is compared with the persistency probability $P_I$ in the next step (block 23) (in this case the terminal belongs to the first type of access). If the random number RN exceeds the persistency probability $P_I$ the terminal cannot send the preamble and again starts with the step indicated in block 21 after a waiting period $T_I(1)$(block 24). In the other case (block 25), the terminal is allowed to transmit the preamble (T→PRE). The terminal checks (block 26) whether a rejection message or an assignment message has been received from the base station (RES?) within a specific period of time. If no message has been received (NO ACK), the step indicated in block 18 (start of loop) is proceeded with after a waiting period $T_I(2)$ (block 27). If a rejection message (NACK) has been received, the start of the loop is also proceeded with after a waiting period $T_I(3)$ (block 28). In the case of an assignment message ACK, as is shown in block 29, the data part of the message packet (TX) is transmitted. This ends the first branch of the loop (block 30, En).

In the second branch of the loop, the same steps are passed through with different parameters. In block 31 the random number RN is compared with the persistency probability $P_{II}$ after the presence has been established of the second type of access $ZT_{II}$. (In this case the terminal belongs to the second type of access). If the random number exceeds the persistency probability value $P_{II}$, the process is continued with block 21 after a waiting period $T_{II}(1)$ (block 32). Otherwise, the preamble is transmitted (block 33, T→PRE). If the terminal receives no message after a specific period of time (block 34, NO ACK), the loop is started again with after a waiting period $T_{II}(2)$ (block 35). In the case of a rejection message (NACK), also after a waiting period $T_{II}(3)$ (block 36) the loop is proceeded with from the start of the loop onwards. When the assignment message occurs (ACK), the data part of the message packet (block 37, TX) is transmitted and the loop is ended (block 38, En).

The base station receives preambles within an access time space which may be part of a reference frame.

Not always are both first and second types of contingency probabilities present. The contingency probabilities $P_I$ and $P_{II}$ are defined by means of the following formulas:

PX1 determines $P_I$ when only contingency probabilities of the first type occur.

$$PX1 = \sum_{l=K_p+1}^{UE_{\max}} \binom{UE_{\max}}{l} p_I^l (1-p_I)^{UE_{\max}-l} \leq REF$$

PX2 determines $P_I$ also when accesses of the second type occur. PX3 determines $P_{II}$ also when accesses of the second type occur.

$$PX2 = \sum_{l=K_p+1-C_{NA}}^{UE_{\max}} \binom{UE_{\max}}{l} p_I^l (1-p_I)^{UE_{\max}-l} \leq REF$$

$$PX3 = \sum_{l_2=1}^{C_{NA}} \sum_{l_1=K_p+1-l_2}^{UE_{\max}-C_{NA}} \binom{C_{NA}}{l_2} p_{II}^{l_2}(1-p_{II})^{C_{NA}-l_2} \cdot \binom{UE_{\max}-C_{NA}}{l_1} p_I^{l_1}(1-p_I)^{UE_{\max}-C_{NA}-l_1} \leq REF$$

Wherein:

| | |
|---|---|
| $UE_{max}$ | Estimate for the maximum number of terminals that simultaneously transmit a preamble. |
| $K_p$ | Number of the preambles that can be simultaneously transmitted in accordance with the degree of interference occurring in the radio cell in the access interval. |
| $C_{NA}$ | Number of rejection messages during an access interval. |
| REF | Probability value. |

The estimate $UE_{max}$ is determined by the base station by means of long-term measurements of the average number of rejection and assignment messages per reference frame.

The degree of interference is determined for each access interval by the base station and provides information about the number of preamble transmissions and data transmissions that are still possible with a tolerable error rate. If, for example 30% of all transmitted bits are erroneous, the error rate cannot be tolerated.

The probability value REF is, for example, $10^6$ and results from attempts in practice which are incorporated in the interference effect of preamble transmissions on dedicated channels.

Generally, the persistency probability $P_{II}$ exceeds the persistency probability $P_I$, so that the accesses of the second type have a shorter waiting time until the data part of the message packet can be transmitted. A second type of access is then preferred or prioritized respectively to a first type of access. With a small traffic load in a radio cell, the persistency probabilities $P_I$ and $P_{II}$ usually have a higher value than with a higher traffic load.

Also a third type of access can be established. This type occurs when the terminal receives an acknowledge message. Also a persistency probability (of the third type) may be defined for this purpose. For fairness' sake, this persistency probability of the third type may be smaller than the first and second types of persistency probability, because terminals that receive an acknowledge message can transmit their random access burst immediately thereafter. A terminal belongs to the third type of access until a certain fourth waiting interval has elapsed, and then again belongs to the first type of access.

FIGS. 3 to 6 show further flow charts for four types of access $ZT_I$ to $ZT_{IV}$. The flow chart in FIG. 3 indicates the various steps in the terminal if a terminal, after the synchronization, wishes to transmit a random access burst containing a preamble part and a data part over a RACH channel.

Figure 3:
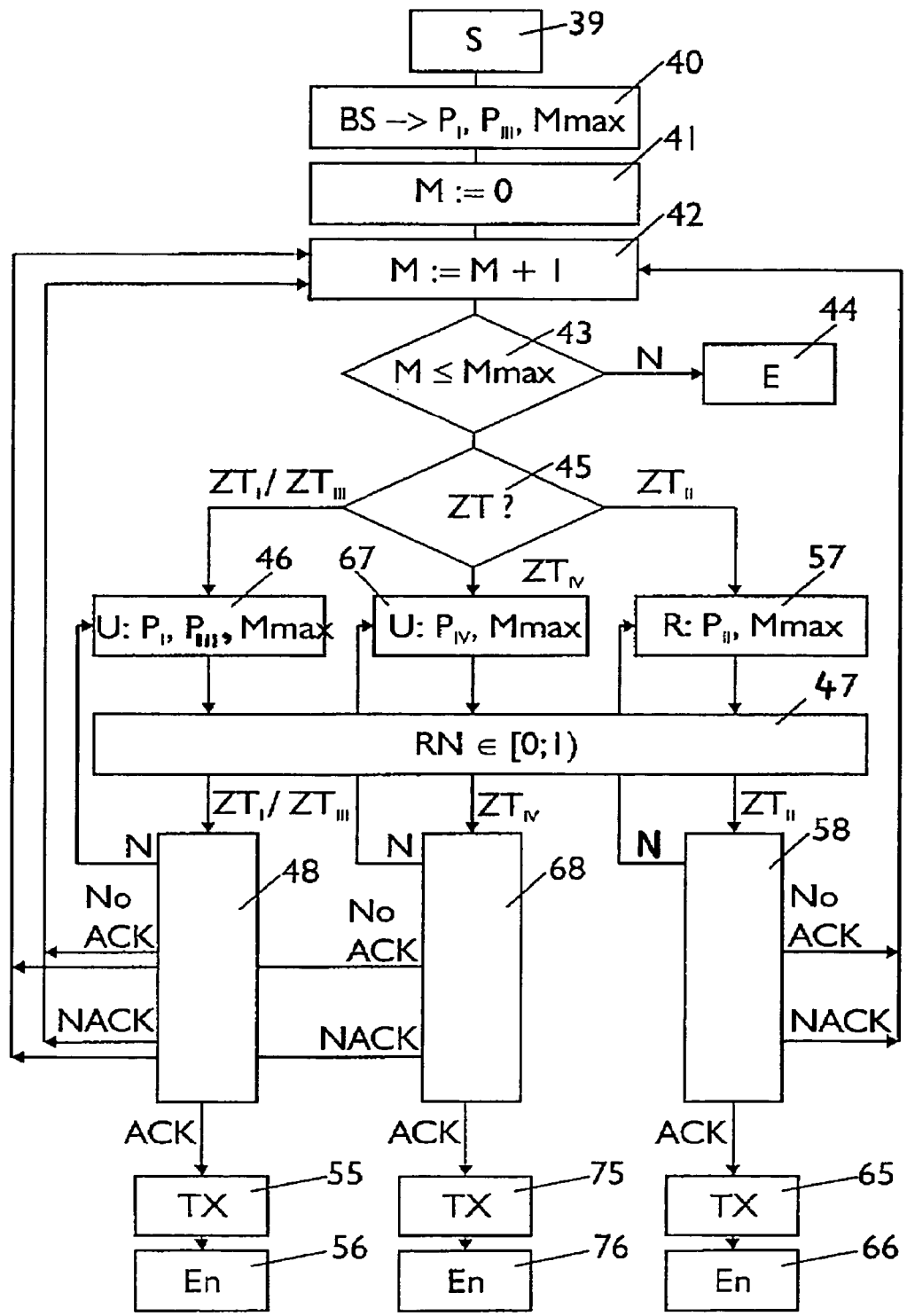

Block 39 in FIG. 3 shows the start (S) of the flow chart. The reception of various control parameters in the terminal (BS→$P_I$, $P_{III}$, Mmax) from the assigned base station is shown in block 40. For example, the base station sends the persistency probability values $P_I$, $P_{III}$, and a maximum value Mmax which indicates the maximum number of successive access attempts, to the RACH channel. First a count variable M is set to zero (block 41). This count variable M denotes the number of the successive transmit attempts of the terminal already started.

The next step in the flow chart leads to a loop. The start of the loop is featured in a block 42 in which the count variable M is incremented. Then, in block 43, a test is made whether the count variable M is smaller than or equal to the maximum value Mmax. If this is not the case, there is a first loop end (block 44). Block 44 indicates an error E. In the other case (block 45) a test is made to find out the type of access ZT. A first type of access $ZT_I$ is encountered when the terminal tries to send a preamble for the first time.

If a first type of access $ZT_I$ occurs (block 46), the parameters $P_I$ and Mmax, which parameters are periodically sent by the assigned base station over a broadcast or distribution channel, are updated (U:$P_I$, Mmax; U=update). An update means that the parameters $P_I$ and Mmax received most recently from the assigned base station are then valid. Subsequently (block 47), the terminal takes a random number RN(RN∈[0,1]) from a random number generator not further shown here.

Figure 4:
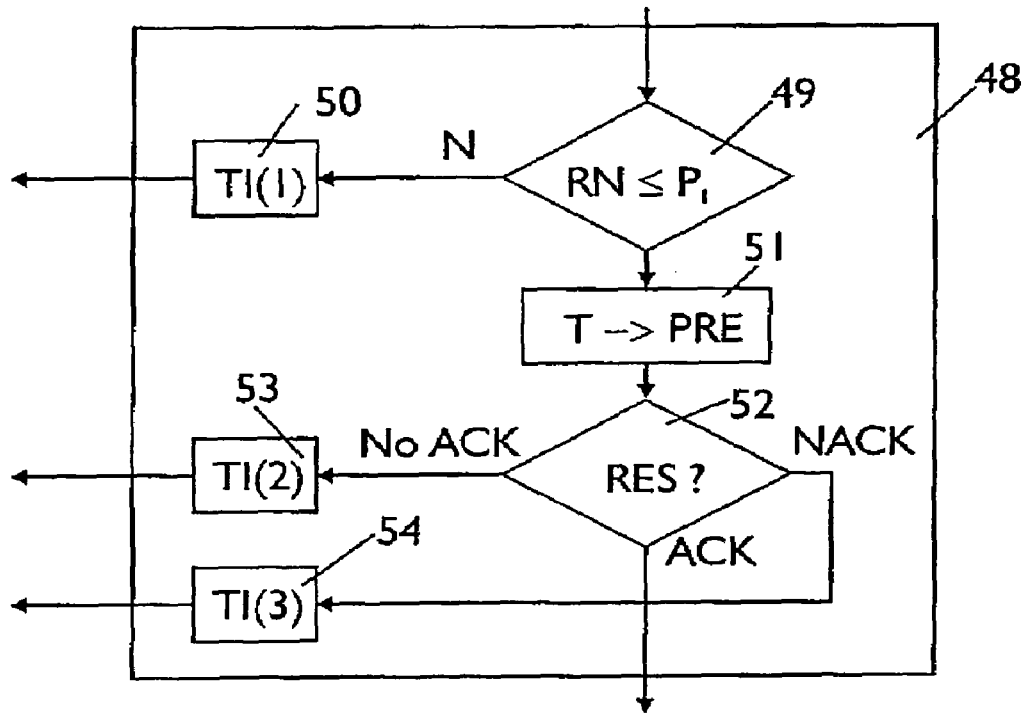

In the present case (first type of access ZTI) the random number RN (FIG. 4: block 49) is first compared in block 48 with the persistency probability value PI (In this case the terminal belongs to the first type of access ZTI). If the random number RN is larger than the persistency probability value PI, the terminal cannot send the preamble and, after a waiting time TI(1) (FIG. 4: block 50), again starts with the step indicated in block 46. In the other case, (FIG. 4: block 51) the terminal is allowed to send the preamble (T□PRE). The terminal subsequently tests (FIG. 4: block 52) whether a rejection message or an assignment message has been received from the assigned base station (RES?) within a specific space of time. If no message has been received (no ACK), the step indicated in block 42 (FIG. 3) (start of the loop) is continued with after a waiting time TI(2) (FIG. 4: Block 53). If a rejection message (NACK) has been received, a start is made with the loop after a waiting time TI(3) (FIG. 4: block 54). In the case of an acknowledge message (ACK), as shown in block 55 (FIG. 3), the data part of the random access burst (TX) is sent. This ends (EN) the first branch of the loop (block 56).

If in block 45 it is detected that a second type of access $ZT_{II}$ is available, the parameters $P_{II}$ and Mmax received next (block 57) from the assigned base station via a broadcast or distribution channel are extracted as a reaction to the previously received rejection message (NACK) (R:$P_I$, Mmax; R=Read). The parameter $P_{II}$ is sent non-periodically, different from the parameter $P_I$, so as not to use the capacity on the broadcast or distribution channel unnecessarily. The periodic transmission may be dispensed with, because the respective value $P_{II}$ only becomes relevant shortly after a rejection message has been sent by the base station. An extraction is understood to mean that the parameters $P_{II}$ and Mmax extracted from the terminal are valid for the first time or from then on. As in the previous case, the terminal subsequently extracts (block 47) a random number RN(RN∈ [0,1]) from the random number generator which is not further shown in detail.

Figure 5:
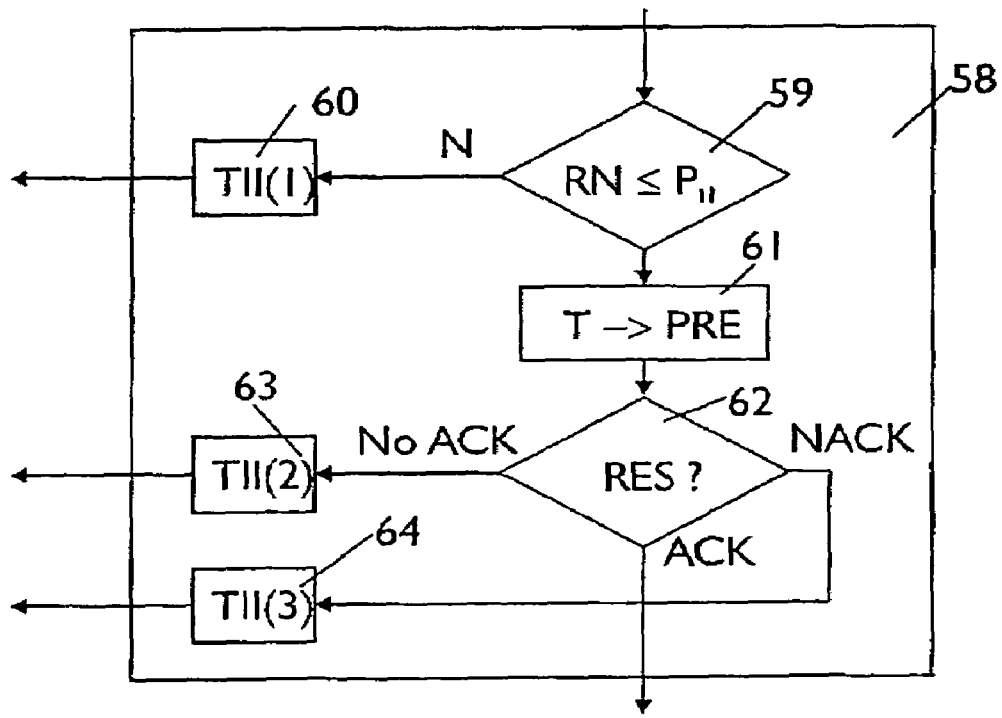

In block 58 the random number RN (FIG. 5: block 59) is compared with the persistency probability value $P_{II}$ (In this case the terminal belongs to the second type of access $ZT_{II}$). If the random number RN exceeds the persistency probability value $P_{II}$, the terminal cannot send the preamble and starts again with the step indicated in block 57 after a waiting time TII(1) (FIG. 5: block 60). In the other case (FIG. 5: block 61) the terminal is allowed to send the preamble (T→PRE). Subsequently, the terminal verifies (FIG. 5: block 62) whether a rejection message or an assignment message has been received from the assigned base station (RES?) within a specific period of time. If no message has been received (No ACK), the procedure is resumed with the step indicated in block 42 (start of loop) after a waiting time TII(2) (FIG. 5: Block 63). If a rejection message (NACK) is received, the procedure is also continued with the start of the loop after a waiting time TII(3) (FIG. 5: block 64). With an assignment message (ACK), as is shown in block 65 (FIG. 3), the data part of the random access burst is sent (TX). This ends (EN) the second branch of the loop (block 66).

If in block 45 it is detected that a third type of access $ZT_{III}$ is available, the respective steps are carried out just like the first type of access $ZT_I$ (blocks 46 to 56).

If in block 45 it is detected that a fourth type of access $ZT_{IV}$ is available, the next thing done (block 67) is that the parameters $P_{IV}$ and Mmax, which are periodically transmitted from the assigned base station by a broadcast or distribution channel, are updated (U: $P_{IV}$, Mmax; U=update). As observed hereinbefore, the terminal subsequently extracts a random number RN (RN∈[0,1]) (block 47) from the random number generator not further shown here.

Figure 6:
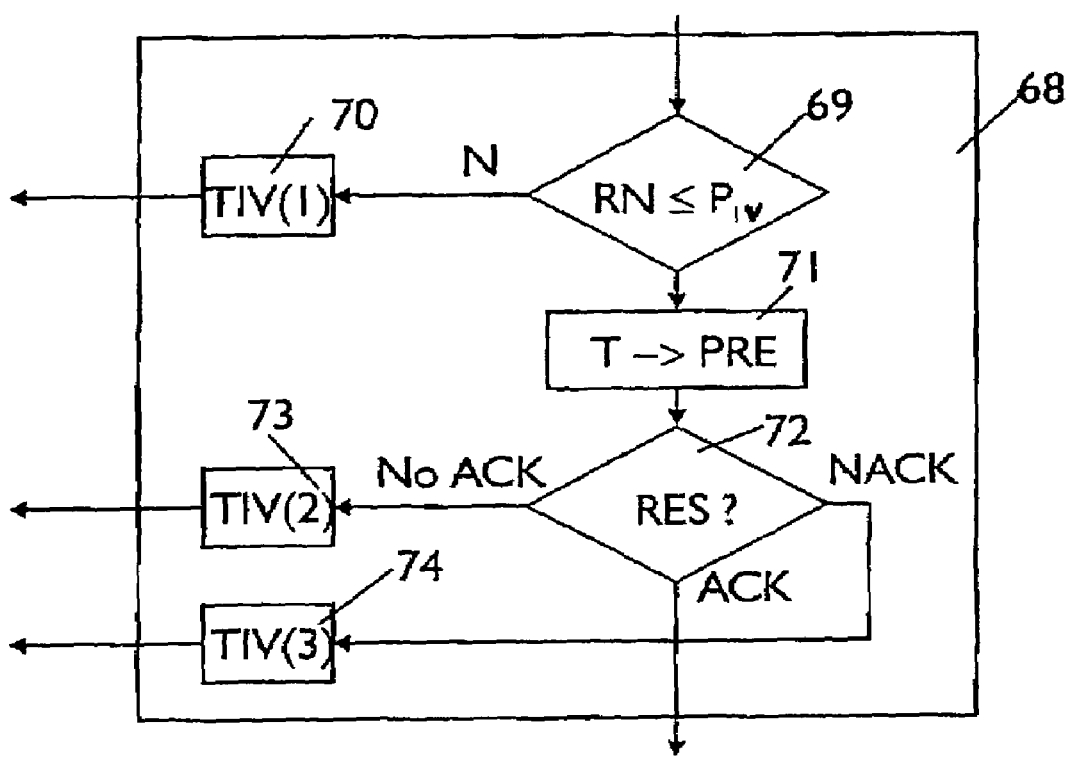

In block 68, the random number RN (FIG. 6: block 69) is compared with the persistency probability value $P_{IV}$ (in this case the terminal belongs to the fourth type of access $ZT_{IV}$). If the random number RN exceeds the persistency probability value $P_{IV}$, the terminal is unable to send the preamble and, after a waiting time TIV(1) (FIG. 6: block 70) again starts with the step indicated in block 67. Alternatively (FIG. 6: block 71), the terminal is allowed to send the preamble (T→PRE). The terminal subsequently verifies (FIG. 6: block 72) whether a rejection message or an assignment message has been received from the assigned base station (RES?) within a specific period of time. If no message has been received (no ACK), the procedure is continued with the step indicated in block 42 (start of loop) after a waiting period TIV(2) (FIG. 6: block 73). If a rejection message is received (NACK), after a waiting period TIV(3) (FIG. 6: block 74) the procedure is also continued with the start of the loop. In the case of an assignment message (ACK), the data part of the random access burst is sent (TX), as is shown in block 75 (FIG. 3). This ends (EN) the third branch of the loop (block 76).

The base station receives preambles within an access time space that may be part of a reference window. The base station determines the persistency probabilities $P_I$ to $P_{IV}$, which depend, for example, on the traffic load, interference condition, a high load for the signal processing of certain circuit portions of the base station when dedicated and RACH channels are received, and on the level of reception of the preambles. The persistency probabilities $P_I$ to $P_{IV}$ may also be determined in accordance with the formulas defined above, or other formulas.

Different persistency probabilities are used for handling reservation requests. If the terminal again sends a preamble for the first time after a defined period of time after the data part has been sent, it is a first type of access (first persistency probability). If the terminal has received a rejection message after a preamble was sent, this implies a second type of access (second persistency probability). If the terminal again sends a preamble within the defined period of time after a data part has been sent, it is a third type of access (third persistency probability). If the terminal has received neither an assignment nor a rejection message after a preamble was sent, and the transmission power has been increased in steps up to a maximum transmission power (power ramping), it is a fourth type of access (fourth persistency probability). As observed hereinbefore, the persistency probabilities for the first, third and fourth types of access are periodically sent to all the terminals over the broadcast or distribution channel, whereas the persistency probability for the second type of access is sent only when a rejection message was sent to all the terminals over the broadcast or distribution channel.

If, for example, the interference or traffic load is too high, the base station sends out a rejection message (NACK) to at least one terminal. Furthermore, via the broadcast or distribution channel mentioned above, information is sent about the parameters $P_{II}$ for the terminals that have received the rejection message (NACK) after the transmission of their preambles. The base station in this case chooses the persistency probability $P_{II}$ lower than the persistency probability $P_I$. The parameters $P_{II}$ may have different values for each preamble answered by a rejection message.

The persistency probability $P_{II}$ laid down by the base station is, in contrast, higher than the persistency probability $P_I$ when there is a high load for the signal processing of certain circuit elements of the base station when dedicated and RACH channels are received.

If during the reception of the preamble the level is unjustifiably high compared to the other reception levels, the base station sets the persistency probability $P_{II}$ to a clearly smaller value than the persistency probability $P_I$, because the excessive level has already led to a noticeably disturbed reception in the base station. An unjustifiably high preamble reception level may occur when a terminal is located very close to the base station.

The advantage of the use of different persistency probabilities for respective preambles lies in the individual adaptation to the respective situation for each terminal and leads to a reduction of the access time. Since the persistency probability $P_{II}$ becomes smaller only after a rejection message (NACK) is sent, there is a smaller signaling load on the broadcast or distribution channel. But the respective causes for the transmission of the rejection message are to be handled individually.

An example of embodiment for a wireless network may be, for example, the currently discussed UMTS Radio Access Network (=UTRAN). First and second types of access can then be used. The third and fourth types of access are in this example counted as a first type of access. In this system, a base station may be assigned a logic node referenced node B and a radio network controller. The logic node is responsible for the radio transmission in at least one radio cell and is connected to the radio network controller via an interface. The radio network controller is responsible for controlling all the components taking part in the radio traffic and sets up, for example, a connection for the transmission of user data.

The physical layer is terminated in the logic node. Rejection messages (NACK) are directly generated by the physical layer and sent to the terminals. One frame contains a total of 8 access slots in which each time 16 preambles can be sent. Per frame this is a total of 128 parallel RACH channels. For each of these channels a rejection message may be sent. A rejection message is closely related to a preamble and the access slot in which the preamble was sent.

Furthermore, there is provided to insert system information (for example, interference conditions) that is often to be updated, directly in the logic node (node B) and not as late as in the radio network controller (RNC) in a broadcast or distribution channel. This is necessary because too large delays would arise as a result of the interfaces positioned between the logic node (node B) and the radio network controller (RNC). This means that time critical system information could not be sent to the radio interface at the right time. The invention advantageously uses this possibility of inserting system information in the distribution channel as early as in the logic node (node B) to insert, in the case of a rejection message, an information element IE in the distribution channel during the frame n after m further frames, which information element IE contains the value of the persistency probability $P_{II}$ for each rejection message sent in frame n. The value m is fixedly predefined (for example, m=2) more specifically, because at least the duration of 2 frames is provided as transmission time for the distribution channel. The value m can be distributed as part of the system information.

More specifically, two cases can be considered for the persistency probability $P_{II}$. In a first case (case of prioritization) the rejection message has been sent because temporarily all the hardware resources are being used for processing already received packets transmitted in the RACH channel. This bottleneck will have gone in the next frame or the next frame but one. The rejected preamble is then to be transmitted in this very frame. For this purpose the persistency probability $P_{II}$ is selected to be larger than the persistency probability $P_I$. A possible value for the persistency probability $P_I$ will even be the value 1.

In the second case (case of the stronger delay) it is possible, due to an inaccurate estimate of data losses during transmissions over up-link channels, that a terminal has chosen too high an initial power for the transmission of a preamble (preamble power). In that case the terminal is to abstain from further attempts at transmitting the preamble until a better estimate of data losses is available. In that case the persistency probability $P_I$ is selected to be clearly smaller than the persistency probability $P_I$.

For coding these various possibilities, in addition to $P_I$ a factor $\alpha>1$ is regularly distributed to all the terminals. The factor $\alpha$ is determined, so that $P_{II}=\min(\alpha P_I, 1)$, if a previously rejected preamble is prioritized, and $P_{II}=P_I/\alpha$, if after a preamble has been rejected, a transmission of this preamble is to be postponed for a longer period of time.

There is a little more elbowroom as regards the structure when for both cases a respective second persistency probability $P_{II}$ is sent to the terminals over the broadcast or distribution channel. In that case, however, not two but three parameters are then to be distributed: $P_I$, $P_{II,1}$ (for prioritization), $P_{II,2}$ for a stronger delay.

If rejection messages are sent in the frame n, m frames later the preamble is coded with 4 bits for each rejection message and 3 bits are used for coding the access slot which the rejection message is referred to. A further bit indicates whether $P_{II,1}$ (for prioritization) or $P_{II,2}$ (for a stronger delay) holds for the sender of the respective preamble for the next transmission attempt of this preamble.

In this way one only needs to have 8 bits for the coding of the persistency probability $P_{II}$ (second type of access). Further bits are necessary, however, for featuring the total information element IE. If the information element IE is set to zero, this means that the transmitted preamble power was too high and the terminal is allowed to send a preamble again only after the transmission power has been further reduced, while in this case $P_t$ controls the transmission of the next preamble.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A wireless network comprising:

a base station; and a terminal for exchanging user data and control data with the base station in dependence upon a plurality of persistency probabilities for assigning various transmissions capacities by the base station for at least one data packet, wherein the terminal is operable to transmit a first reservation request for a first time to the base station in dependence on a first persistency probability, the first reservation request being associated with a first data packet, further wherein the base station sends the first persistency probability periodically over a broadcast channel, wherein, only after a transmission of a rejection message sent by the base station over the broadcast channel corresponding to the first reservation request, the terminal is further operable to transmit the first reservation request for at least one additional time to the base station in dependence on a second persistency probability, wherein the rejection message is linked to a rejected preamble of the respective reservation request such that the second persistency probability is determined differently depending on the rejected preamble, and further wherein the base station sends the second persistency probability non-periodically, different from the first persistency probability, so as not to use a capacity of the broadcast channel unnecessarily, wherein, during a defined space of time after a complete transmission of the first data packet by the terminal to the base station, the terminal is further operable to transmit a second reservation request in dependence on a third persistency probability, the second reservation request being associated with a second data packet, further wherein the base station sends the third persistency probability periodically over the broadcast channel, and wherein, in response to the terminal neither receiving an assignment message nor the rejection message corresponding to the first reservation request from the base station after a step-by-step increase of a transmission power to a maximum value by the terminal over at least two transmissions of the first reservation request by the terminal to the base station, the terminal is further operable to transmit the first reservation request for at least one additional time to the base station in dependence of a fourth persistency probability, further wherein the base station sends the fourth persistency probability periodically over the broadcast channel.

2. The wireless network of claim 1, wherein the first data packet includes a preamble part; and wherein the terminal is operable to transmit the preamble part as the first reservation request.

3. The wireless network of claim 1, wherein the first data packet includes a data part; and wherein, after receiving an assignment message corresponding to the first reservation request from the base station, the terminal is further operable to transmit the data part to the base station.

4. The wireless network of claim 1, wherein the terminal is further operable to transmit the first reservation request for the first time to the base station in further dependence of a first comparison of the first persistency probability and a first random number.

5. The wireless network of claim 4, wherein the terminal is further operable to transmit the first reservation request for an additional time to the base station in further dependence of a second comparison of the second persistency probability and a second random number.

6. The wireless network of claim 4, wherein the terminal is further operable to transmit the first reservation request for an additional time to the base station in further dependence of a second comparison of the fourth persistency probability and a second random number.

7. The wireless network of claim 4, wherein the terminal is further operable to transmit the second reservation request to the base station in further dependence of a second comparison of the third persistency probability and a second random number.

8. A base station in a wireless network including a plurality of terminals, the plurality of terminals including at least a first terminal for exchanging user data and control data with the base station in dependence upon a plurality of persistency probabilities for assigning various transmissions capacities for at least one data packet, the base station comprising:

means for periodically transmitting a first persistency probability over a broadcast channel to the plurality of terminals whereby the first terminal is operable to transmit a first reservation request for a first time to the base station in dependence on the first persistency probability, the first reservation request being associated with a first data packet;

means, subsequent to a transmission of the first reservation request for the first time by the first terminal to the base station and only after a transmission of a rejection message sent by the base station over the broadcast channel so as not to use a capacity of the broadcast channel unnecessarily, for non-periodically transmitting a second persistency probability to the plurality of terminals, whereby the first terminal is further operable to transmit the first reservation request for an additional time in dependence of the second persistency probability, wherein the rejection message is linked to a rejected preamble of the respective reservation request such that the second persistency probability is determined differently depending on the rejected preamble; and means for periodically transmitting at least one of a third persistency probability and a fourth persistency probability to the plurality of terminals whereby the first terminal is further operable to transmit a second reservation request in dependence on the third persistency probability during a defined space of time after a complete transmission of the first data packet by the terminal to the base station, the second reservation request being associated with a second data packet and further operable to transmit the first reservation request for at least one additional time to the base station in dependence on the fourth persistency probability in response to the terminal neither receiving an assignment message nor the rejection message corresponding to the first reservation request from the base station after a step-by-step increase of a transmission power to a maximum value by the first terminal over at least two transmissions of the first reservation request.

9. A terminal in a wireless network including a base station for exchanging user data and control data with the terminal in dependence upon a plurality of persistency probabilities for assigning various transmissions capacities by the base station for at least one data packet, the terminal comprising:

means for transmitting a first reservation request for a first time to the base station in dependence on a first persistency probability, the first persistency probability being periodically transmitted by the base station over a broadcast channel, and the first reservation request being associated with a first data packet;

means, subsequent to a transmission of the first reservation request for the first time by the terminal to the base station and only after a transmission of a rejection message sent by the base station over the broadcast channel so as not to use a capacity of the broadcast channel unnecessarily, for transmitting the first reservation request for an additional time in dependence of a second persistency probability, the second persistency probability being non-periodically transmitted by the base station over the broadcast channel, wherein the rejection message is linked to a rejected preamble of the respective reservation request such that the second persistency probability is determined differently depending on the rejected preamble;

means, during a defined space of time after a complete transmission of the first data packet by the terminal to the base station, for transmitting a second reservation request in dependence on a third persistency probability, the third persistency probability being periodically transmitted by the base station over the broadcast channel and the second reservation request being associated with a second data packet; and means, responsive to the terminal neither receiving an assignment message nor the rejection message corresponding to the first reservation request from the base station after a step-by-step increase of a transmission power to a maximum value by the terminal over at least two transmissions of the first reservation request, for transmitting the first reservation request for at least one additional time to the base station in dependence on the fourth persistency probability, the fourth persistency probability being periodically transmitted by the base station over the broadcast channel.

* * * * *